(12) United States Patent
Smith

(10) Patent No.: US 9,483,412 B2
(45) Date of Patent: Nov. 1, 2016

(54) METHOD AND APPARATUS FOR REFORMATTING PAGE TABLE ENTRIES FOR CACHE STORAGE

(71) Applicant: Advanced Micro Devices, Inc., Sunnyvale, CA (US)

(72) Inventor: Wade K. Smith, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 78 days.

(21) Appl. No.: 14/516,192

(22) Filed: Oct. 16, 2014

(65) Prior Publication Data

US 2015/0121009 A1 Apr. 30, 2015

Related U.S. Application Data

(60) Provisional application No. 61/897,697, filed on Oct. 30, 2013.

(51) Int. Cl.
*G06F 12/10* (2016.01)
*G06F 12/08* (2016.01)

(52) U.S. Cl.
CPC ....... *G06F 12/1009* (2013.01); *G06F 12/0811* (2013.01); *G06F 12/0826* (2013.01); *G06F 2212/622* (2013.01); *G06F 2212/652* (2013.01)

(58) Field of Classification Search
CPC .......... G06F 12/1009; G06F 12/0811; G06F 2212/652; G06F 2212/622; G06F 12/0826
See application file for complete search history.

(56) References Cited

U.S. PATENT DOCUMENTS 7,539,843 B2 * 5/2009 Kruger ................ G06F 12/1009 711/207
2006/0230223 A1 * 10/2006 Kruger ................ G06F 12/1009 711/6

* cited by examiner

*Primary Examiner* — David X Yi
*Assistant Examiner* — Zubair Ahmed
(74) *Attorney, Agent, or Firm* — Faegre Baker Daniels LLP

(57) ABSTRACT

A device for and method of storing page table entries in a first cache. A first page table entry is received having a fragment field that contains address information for a requested first page and at least a second page logically adjacent to the first page. A second page table entry is generated from the first page table entry to be stored with the first page table entry. The second page table entry provides address information for the second page. The second page table entry has a configuration that is compatible with the first cache.

20 Claims, 3 Drawing Sheets

METHOD AND APPARATUS FOR REFORMATTING PAGE TABLE ENTRIES FOR CACHE STORAGE

PRIORITY

The present application is a non-provisional application of U.S. Provisional Application Ser. No. 61/897,697, titled METHOD AND APPARATUS FOR REFORMATTING PAGE TABLE ENTRIES FOR CACHE STORAGE, filed Oct. 30, 2013, the disclosure of which is incorporated herein by reference and the priority of which is hereby claimed.

FIELD OF THE DISCLOSURE

The present disclosure is related to methods and devices for facilitating increased hit rates in cache. The present disclosure is related more specifically to methods and devices facilitating hit rates in cache by configuring page table entries to match storage constraints presented by cache memory of virtual memory systems.

BACKGROUND

The ever-increasing capability of computer systems drives a demand for increased memory size and speed. The physical size of memory cannot be unlimited, however, due to several constraints including cost and form factor. In order to achieve the best possible performance with a given amount of memory, systems and methods have been developed for managing available memory. One example of such a system or method is virtual addressing, which allows a computer program to behave as though the computer's memory was larger than the actual physical random access memory (RAM) available. Excess data is stored on hard disk and copied to RAM as required.

Virtual memory is usually much larger than physical memory, making it possible to run application programs for which the total code plus data size is greater than the amount of RAM available. The process of detecting invalid pages and bringing the page data in only when it is actually needed is known as "demand paged virtual memory". A page is copied from disk to RAM ("paged in") when an attempt is made to access it and it is not already present. This paging is performed automatically, typically by collaboration between the central processing unit (CPU), the memory management unit (MMU), and the operating system (OS) kernel. The application program is unaware of virtual memory; it just sees a large address space, only part of which corresponds to physical memory at any instant. The virtual address space is divided into pages. Each virtual address output by the CPU is split into a (virtual) page number (the most significant bits) and an offset within the page (the N least significant bits). Each page thus contains $2^N$ bytes. The offset is left unchanged and the MMU maps the virtual page number to a physical page number. This is recombined with the offset to give a physical address that indicates a location in physical memory (RAM). The performance of an application program depends on how its memory access pattern interacts with the paging scheme. If accesses exhibit a lot of locality of reference, i.e. each access tends to be close to previous accesses, the performance will be better than if accesses are randomly distributed over the program's address space, thus requiring more paging. In a multitasking system, physical memory may contain pages belonging to several programs. Without demand paging, an OS would need to allocate physical memory for the whole of every active program and its data, which would not be very efficient in use of available physical memory.

In general, the overall performance of a virtual memory/page table translation system is governed by the hit rate in the translation lookaside buffers (TLBs). A TLB is a table that lists the physical address page number associated with each virtual address page number. A TLB is typically used as a level 1 (L1) cache whose tags are based on virtual addresses. The virtual address is presented simultaneously to the TLB and to the cache so that cache access and the virtual-to-physical address translation can proceed in parallel (the translation is done "on the side"). If the requested address is not cached, the physical address is used to locate the data in memory that is outside of the cache. This is termed a cache "miss". If the address is cached, this is termed a cache "hit".

A page table in a virtual memory system is an array that contains an entry for each current virtual-to-physical address translation. A page table entry (PTE) in the page table typically contains a physical page number and flag bits. Pages are of a uniform size and the smaller the page size, the less likely a reference to a particular page will result in a cache hit. Pages can also be combined into contiguous sections of memory known as fragments. A fragment is a contiguous series of physical pages. 100% fragmentation of memory implies one page per fragment. As average fragment size increases, or fragmentation decreases, the hit rate increases markedly.

It is desirable for virtual memory systems accessing a physical memory to employ techniques that increase hit rates. Challenges encountered in the design of such virtual memory systems include the constraints imposed by the memory architecture to which the virtual memory system must interface, including a fixed page size and a dictated page table entry format. Indeed, changing a page table entry format incurs a relatively high processing cost. Accordingly, solutions are desired that do not require reformatting of the page table.

DETAILED DESCRIPTION OF EMBODIMENTS

In an exemplary and non-limited embodiment, aspects of the invention are embodied in a method of storing page table entries in a first cache. A first page table entry is received, the first page table entry having a fragment field that contains address information for a requested first page and at least a second page logically adjacent to the first page. A second page table entry is generated from the first page table entry to be stored with the first page table entry. The second page table entry provides address information for the second page. The second page table entry has a configuration that is compatible with the first cache.

In another example, a page table entry allocation device is provided including: a first cache having a first native configuration; a second cache having a second native configuration; a table entry formatter operable to convert a received page table entry into one of the first and second native configurations such that each formatted table entry is able to be interpreted without reference to another page table entry.

In yet another example, a method of allocating page table entries between a plurality of available caches is provided including receiving a first page table entry having a fragment value, the first page table entry having information regarding a requested first page and regarding at least a second page logically adjacent to the requested first page; receiving configuration data regarding an available configurable cache; generating a second page table entry from the first page table entry; and combining the first page table entry and the second page table entry to generate a cache line consistent with a cache line configuration of one of the available caches.

Figure 1:
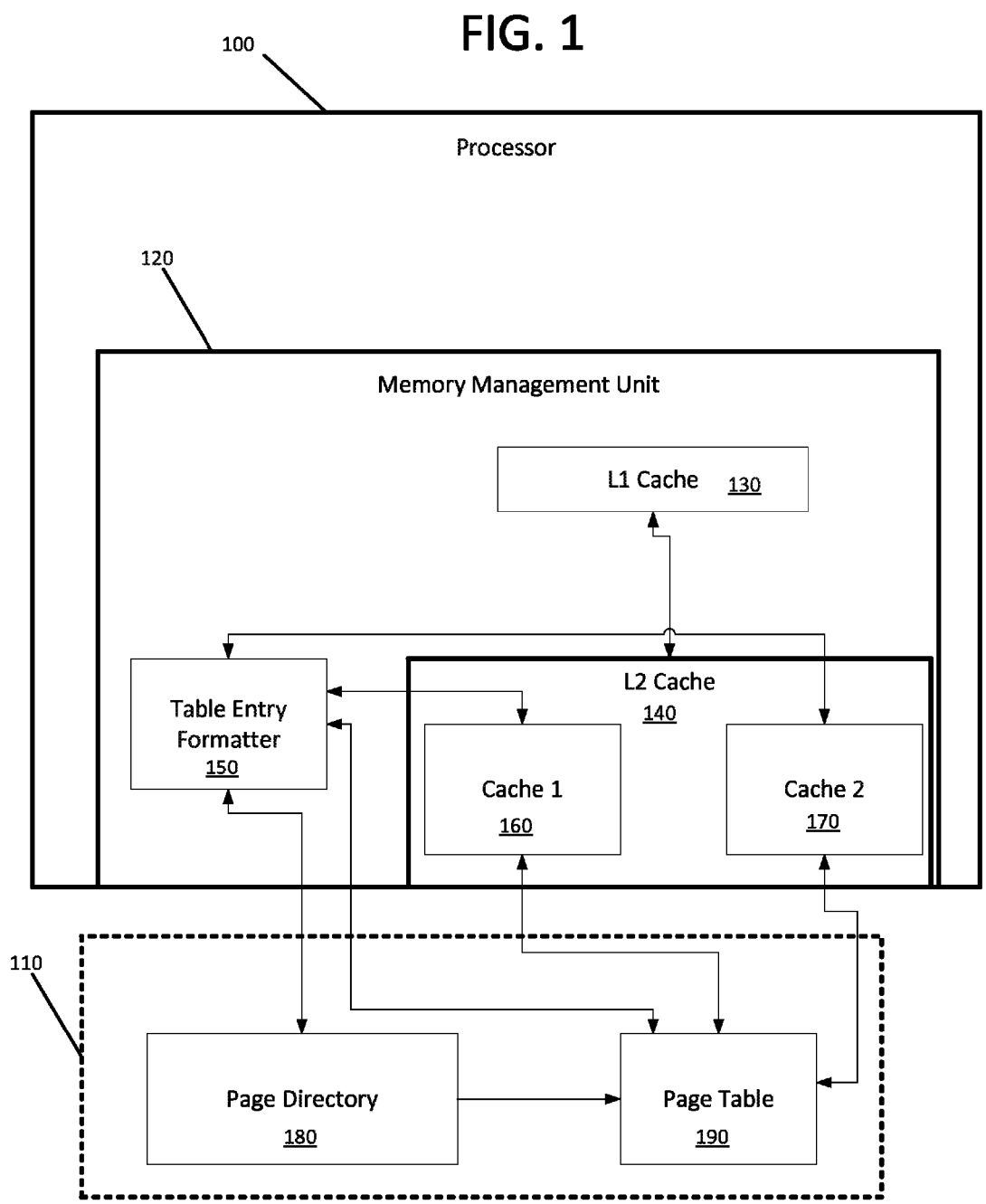
FIG. 1 is a diagram showing exemplary architecture of a system employing virtual memory management.

FIG. 1 shows a computing system that includes processor 100, and a multi-level page table 110. Processor 100 includes memory management unit (MMU) 120. MMU 120 includes level 1 (L1) cache 130, level 2 (L2) cache 140, and table entry formatter 150.

L1 cache 130 functions both as a L1 cache and a translation lookaside buffer (TLB) for the L1 cache. L2 cache 140 includes cache 1, 160, and cache 2, 170. It should be appreciated that while two caches within L2 cache 140 are shown, the use of two caches is exemplary and embodiments with additional caches are envisioned.

Table entry formatter 150 as shown is processor 100 (more specifically, memory management unit 120) that is executing code. Table entry formatter 150 is operable to allocate Page Table Entries (PTEs) between cache 1, 160 and cache 2, 170. Table entry formatter 150 is further operable to take PTEs that identify multiple pages (one explicitly, the balance implicitly) and convert the address that is explicit to one storage location to an address that is explicit for a second storage location. Table entry formatter 150 is further operable to obtain one or more PTEs and properly format them to a format for which the chosen cache (160, 170) is configured. A more full discussion of these functions and an exemplary manner of obtaining them is discussed further below.

Cache 1, 160, is a "small" cache (or "4 k" cache) relative to cache 2, 170, which is a "big" cache (or "bigk" cache); the "size" refers to the native address space embodied in each page table entry. The "4 k" cache defines a fixed 4 kbyte PTE size while the size of a PTE for the "bigk" cache is a programmable power-of-2 multiple of 4 kbytes. In the present example, cache 1, 160, adheres to the following specifications: 32-byte cache line size; 128 cache lines (4 k-bytes) per page; and each cache line holds four page table entries (512 64-bit page table entries can be stored therein at any given time). However, it should be appreciated that this specification is exemplary. Indeed, embodiments are envisioned where cache 1, 160, is dynamic such that the specification is changeable at run-time (a configurable cache). Accordingly, cache 1, 160 in the exemplary embodiment is optimized for 4 k fragment page table entries.

Cache 2, 170 is illustratively designed for storing fragment sizes larger than those sized for cache 1, 160. In the exemplary embodiment, cache 2, 170 is a dynamic (configurable) cache that can be optimized for differing fragments sizes as dictated by MMU 120. Accordingly, while cache 1, 160 is configured for storing cache lines having four PTEs with each PTE representing a single 4 k page, cache 2, 170 is configured for storing cache lines having a single PTE that identifies a greater number (8, 16, 32, etc) of pages (or a single page that is larger). Again, implementations are envisioned where cache 2, 170 is configured for storing cache lines having 4 (or another number) of PTEs within a cache line.

Multi-level page table 110 includes a page directory 180 and one or more page tables 190. In one embodiment, page directory 180 illustratively contains 1024 page directory entries (PDEs), each of which points to a $2^{nd}$ level page table 190. In one embodiment, each $2^{nd}$ level page table 190 is a 4 k-byte page table containing 512 64-bit page table entries (PTEs). However, it should be appreciated that page tables come in many sizes. Furthermore, individual page tables may contain any number of PTEs. However, it is most common that the number of PTEs within a page table be a power of 2 (1, 2, 4, 8, 16, 32, 64, 128, 256, 512 . . . 2 GB).

Figure 2:
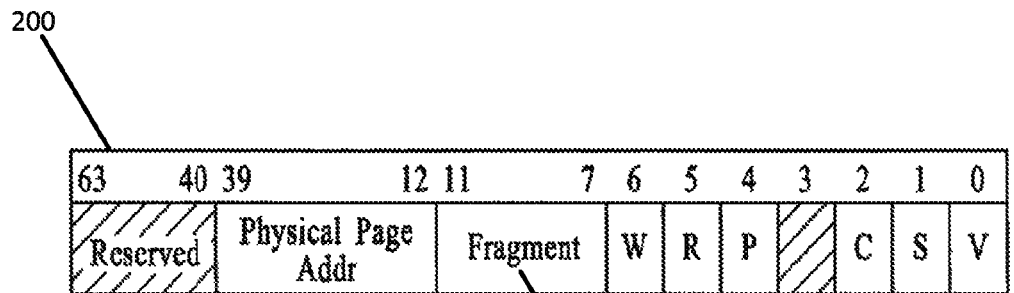
FIG. 2 is a diagram showing an exemplary page table entry according to an embodiment operable with the system of FIG. 1.
Figure 3:
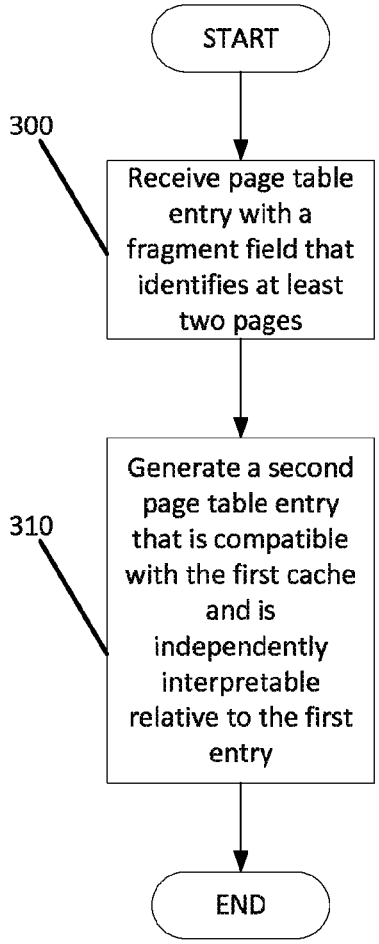
FIG. 3 is a flowchart showing an embodiment of operation for the system of FIG. 1.

FIG. 2 is a diagram of page table entry (PTE) 200 according to an embodiment. In one embodiment, a page in the page table is 4 k-bytes in size. In the embodiment of FIG. 2, each PTE 200 is a 64-bit (8 byte) word. There is one PTE 200 for each 4 k-byte logical page of addressable memory. This allows the page table logic to generate up to 40 bits of output given a 32-bit input address. The lower 40 bits of the 64-bit PTE 200 are used for translation purposes.

Notably, PTE 200 includes a fragment field 202. Fragment field 202 provides directives regarding the degree of fragmentation of the physical address space and allows for significant optimization of TLB hit rates when fragmentation is low (that is, fragments are relatively large). Using the fragment field implies that physical pages are contiguous within this fragment, and that the logical start address of the fragment is aligned on the corresponding fragment size boundary. The size of the fragment is a power of two such that a value of 0 indicates a fragment size of one page or 4 k-bytes, a value of 1 corresponds to a two-page or 8 k-byte fragment, a value of 2 indicates a four-page or 16 k-byte fragment, and so on via powers of two. A more detailed description of the fragment field and its implementation is disclosed in U.S. Pat. Nos. 7,447,869 and 7,539,843, the disclosures of both of which are incorporated herein by reference.

Thus, with a fragment value of 3, the fragment size is 32 k-bytes or eight pages, and this fragment begins on a 32 k-byte boundary in logical, but not necessarily physical, address space. Cache 2, 170, is discussed herein as being configured for a 32 k-byte fragment page table entry format. However, cache 2, 170 is a configurable cache that is able to be configured at run-time to more fully optimize the operations discussed herein.

It should be appreciated that when a TLB receives a translation request for a PTE, if that PTE is not resident in the level of cache being queried, this is considered a cache miss and a deeper level of memory is consulted to obtain the requested data (a "fetch"). In the present example, when a PTE is fetched and the fragment value in the PTE is 0, it is fetched as part of a cache line that contains at least four similarly sized PTEs. Fetching one PTE (the requested PTE) also fetches the other PTEs ("tag-along" PTEs) that are located in the same cache line as the requested PTE (a.k.a "overfetch").

Embodiments are envisioned where a request for a PTE returns only the PTE entry requested rather than a cache line including other discrete PTEs (such as those with larger fragment sizes). Even in this example, when the requested PTE has a fragment value greater than 0, the fetch of the requested PTE effectively results in translation information for implied PTEs being returned also. Implied PTEs are PTEs that are determinable from the requested PTE in view of the fragment value.

Certain fetches are described herein as being part of a cache line having multiple PTEs and other fetches are described herein as simply returning a cache line having only the exact PTE requested. The present method is envisioned to be used regardless of whether a PTE fetch also brings tag-along PTEs.

As noted, implied PTEs, are identifiable due to being part of a fragment. Determining the address of implied PTEs requires reference to another PTE (the explicit PTE) to decode. This is referred to herein as an "implied address." Accordingly, for implied PTEs that are effectively fetched due to being part of a fragment, the references to those implied PTEs are relative to the explicit (requested) PTE.

Figure 4:
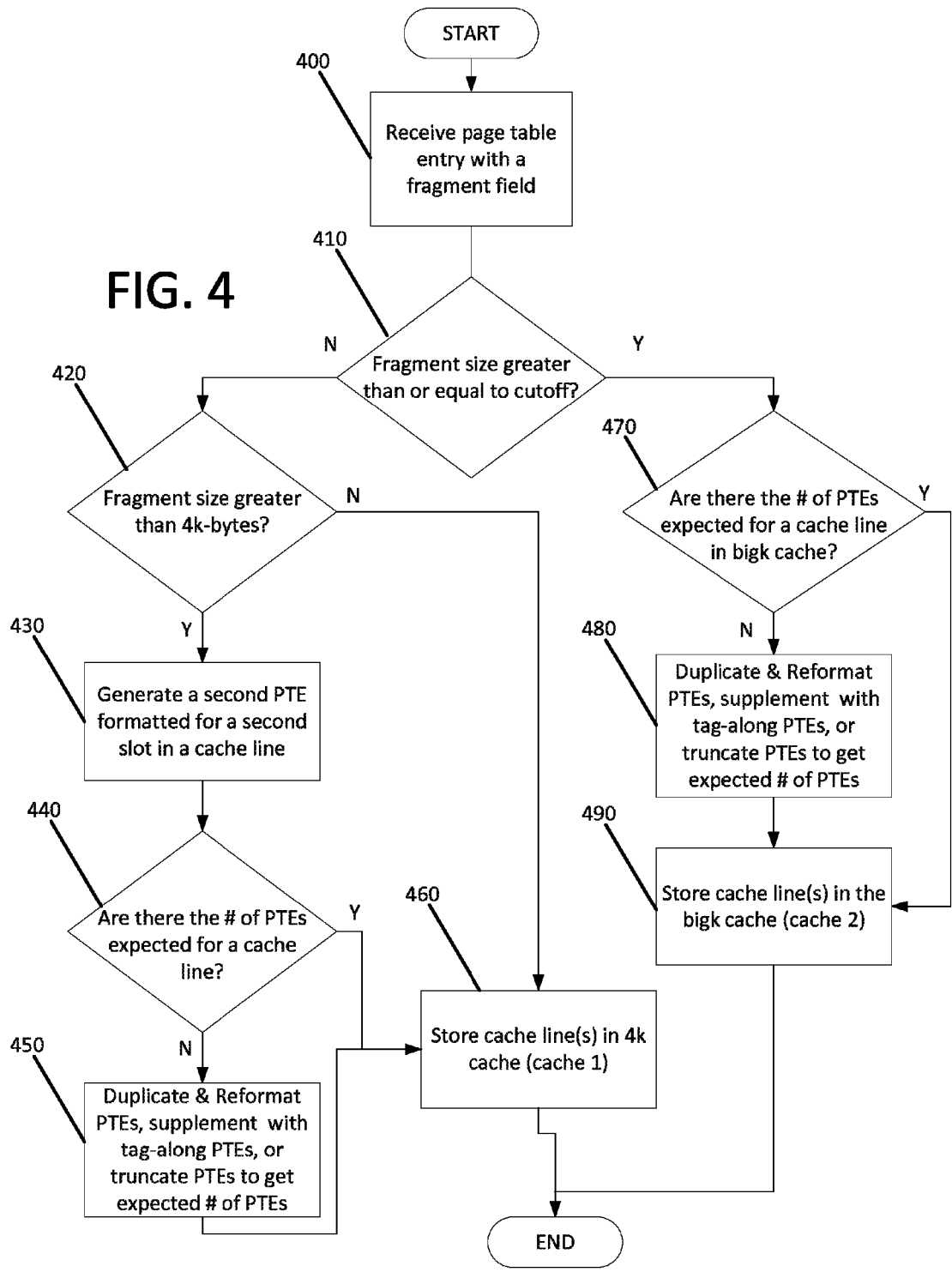
FIG. 4 is a flowchart showing another embodiment of operation for the system of FIG. 1.

When a PTE is fetched via page directory 180 (or page table 190) it is read in as part of a cache line that contains four PTEs. When the requested PTE is received by table entry formatter 150, block 400 of FIG. 4, table entry formatter 150 considers in which of cache 1, 160, and cache 2, 170, to place the fetched PTE. Again, in the present example, cache 1, 160 is configured to store cache lines having 4 PTEs where each PTE represents a 4 k-byte logical page of addressable memory. Cache 2, 170 is illustratively configured to store PTEs that have a fragment value of 3 or greater (32 k-byte fragments representing 8 pages).

As part of determining where to place a fetched PTE, table entry formatter 150 obtains a cut-off value. This cut-off value is obtained via being generated by table entry formatter 150, via being generated by MMU 120 generally, via being generated by the operating system, via being generated by device drivers, or otherwise, block 510. In the present example, the cutoff value is a fragment size of 32 k-bytes. Table entry formatter 150 determines if the fragment size in the obtained PTE is greater than or equal to the cutoff value, block 410. If an obtained PTE represents a fragment size of less than 32 k-bytes then the PTE is directed to cache 1, 160. If an obtained PTE represents a fragment size of 32 k-bytes or greater, the PTE is directed to cache 2, 170. Accordingly, regardless of whether the fragment size for the requested PTE is obtained from the page directory 180 or directly from the page tables 190, it is the fragment value of the obtained PTE that is used to determine which cache (160, 170) the PTE will be directed to.

Table entry formatter 150 then determines if the fragment size in the obtained PTE is greater than 4 k-bytes, block 420. If the obtained PTE has a fragment value of 0, then table entry formatter 150 knows that this represents a 4 k-byte fragment (with no implied PTEs) and the requested PTE (and its associated tag-along PTEs in the same cache line, 4 total pages) is directed to cache 1, 160. In that cache 1, 160 is configured for exactly this type of cache line and PTEs, cache 1, 160 readily accepts the cache line without any need for alteration of the cache line. The requested PTE and tag along PTEs of the cache line are placed in cache 1, 160, taking up four entries therein, block 460.

Figure 5:
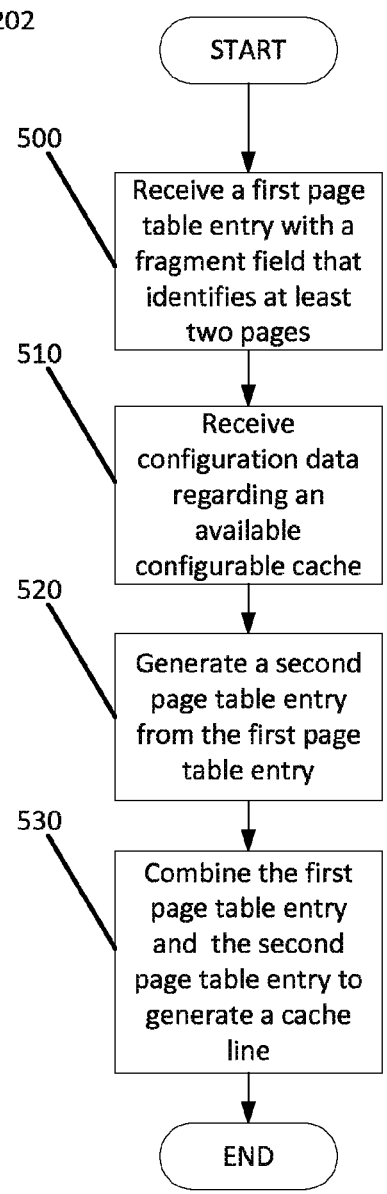
FIG. 5 is a flowchart showing another embodiment of operation for the system of FIG. 1.

If the obtained PTE has a fragment value of 1, then it represents an 8 k-byte fragment (representing 2 pages, one of which is the requested page and one that is identified via an implied PTE). Table entry formatter 150 has thus received a page table entry with a fragment field that identifies at least two pages, block 300, 500 (FIG. 5). In that the 8 k-byte fragment is less than the 32 k-byte cutoff, table entry formatter 150 directs the obtained PTE (and any tag-along PTEs) to cache 1, 160. However, prior to sending the obtained PTE, table entry formatter 150, reformats the PTE into the format of cache 1, 160.

First, as previously noted, the obtained PTE (with an 8 k-byte fragment) is a single PTE that is able to provide translation information (PTE) for two pages. One page (the first page) is explicitly called out and the second page is called out via a relative reference to the explicitly called out page via the fragment field. Accordingly, the first PTE is maintained with a fragment value of 1 such that it identifies itself and identifies (implicitly) a second 4 k page of address space. This (first) PTE is in a format that is ready to be accepted by one slot within a cache line of cache 1, 160. However, there are three other slots within the cache line to be filled. Accordingly, a second (and third and fourth) PTE is generated to go in a second (and third and fourth) slot of the cache line.

As previously noted, the returned PTE explicitly identifies the first page and implicitly identifies a second page relative to the first page. Thus, a second PTE is created that explicitly identifies the formerly implicity PTE and implicitly identifies the formerly explicit PTE. When generating the second PTE, if the first PTE is simply copied and only the explicit address was changed, it will not correctly implicitly identify the first (formerly explicit) page within the PTE. Overall, the implicit identification is specific to the explicit page used as a reference point. Thus, if the reference point is to be changed, the identifications for the relative implicit pages must also be changed.

To create PTEs (derived PTEs) for the other slots in the cache line, the original PTE is duplicated and physical page address in the duplicated copy is modified, block 430, block 310, 520. The physical page address is changed to one of the previously implied page addresses. The fragment value is maintained at 1 and the implied address information is "fixed" so that it properly points to the physical address that was formerly explicit.

The creation of an additional (derived) PTE involves creating a new physical page address value that matches the corresponding start of that native page within the desired fragment. It is computed by subtracting out the offset from the start of the fragment in logical address space and adding that offset to the start of the fragment in the physical address space. This allows each new (derived) PTE to be used independently from the cache when it is referenced at some later time during a cache lookup.

Stated differently, the PTE returned information that said "I'm address 1 and address 2 is just after me (via offset)." The process above describes creating a second (derived) PTE that says "I'm address 2 (address 1 plus offset) and address 1 is just before me (via offset)."

At this point, there are two PTEs (the original and the derived) that have proper address information which is in the PTE format expected by cache 1, 160. Table entry formatter 150 then checks to see if the number of PTEs that it has are the number of PTEs that are expected in a cache line by the destination cache, block 440. As previously discussed, cache 1, 160 expects a group of four PTEs as part of a cache line. Accordingly, each of the two PTEs (original and derived) are duplicated to provide four PTEs, block 450. Again, if necessary, the newly created copies are re-formatted, block 450. These four PTEs are then combined into a cache line, block 530, provided to cache 1, 160 as a cache line, and stored in cache 1, 160, block 460. It should be appreciated that the setting to expect a group of four PTEs in a cache line is exemplary only. Indeed, embodiments are envisioned where groups of eight or more PTEs are read at a time and stored together. Still further, as discussed herein, cache 2, 170 is configured to receive single PTEs, this detail is also merely exemplary.

Still further, the above discussion of the creation of the derived PTE contemplated that the derived PTE has the same fragment value as the original PTE. Additional embodiments envision third and fourth PTEs that are derived PTEs. The third PTE would explicitly identify the originally explicit address but have a fragment size of 0, thus declining to identify implied PTE. The fourth PTE would explicitly identify the originally implicit address but have a fragment size of 0, thus declining to identify the originally explicit PTE. (Similarly, for embodiments described below with larger fragment sizes, additional derived PTEs are envisioned where the fragment values therefore are less than that of the original PTE from which they are derived such that they identify less pages than the original PTE.)

In this way, each entry within a cache line represents a valid entry that can be used for address translation. If the other two slots were not filled, then those slots, when checked as part of an address translation, would be labeled as invalid and necessarily result in a cache miss. Thus, the filling of all the slots increases the likelihood of getting a cache hit. Furthermore, if one copy of a PTE is invalidated within a cache for any reason, the existence of the second copy still allows that cache to generate a "hit" with respect to the addresses represented by the PTE.

In another embodiment, when the obtained PTE has a fragment value of 1, representing 2 pages, the requested PTE is obtained as part of a cache line having 4 other PTEs therein. In such a case, table entry formatter 150 has obtained at least 5 PTEs (the two identified by the requested PTE (one explicit, one implied), and then at least three more tag-along PTEs from the cache line, potentially more if the tag-along PTEs have non-zero fragment values thus giving them other implied PTEs of their own). In such a case, table entry formatter 150 has at least 5 PTEs while cache 1, 160 is configured to receive 4. In making a determination if the number of PTEs is the correct number relative to the expected number, block 440, the answer is no. In such a case, table entry formatter 150 must determine which PTEs to provide to cache 1, 160. The requested PTE is definitely one of the four to be sent. The other three PTEs to be sent are selected from the at least four other PTEs (3 tag along, 1 implied). The manner for selecting which of the "other PTEs" are sent to cache 1, 160, can be chosen at random, can be the subject of an algorithm, or otherwise. Regardless of the method, the obtained group of greater than four PTEs is truncated such that less than all of them are stored in cache 1, 160, block 450. Whichever PTEs are to be sent, table entry formatter 150 again re-formats any physical page addresses of the PTEs to provide them with proper addresses based on their explicit address from which other addresses are implied. Once properly assembled and formatted, the cache line is sent and stored in cache 1, 160, block 460.

If the obtained PTE has a fragment value of 2, then it is a 16 k-byte fragment (representing 4 pages, one of which is the requested page). In that this is less than the 32 k-byte cutoff, table entry formatter 150 directs the obtained PTEs to cache 1, 160. Again, three additional (derived) PTEs are generated from the implied PTEs indicated by the fragment, block 430. Furthermore, to the extent that the fetch resulted in greater than 4 pages being identified by the returned PTEs, (determined at block 440) the PTEs are reformatted and the group is truncated to fit the configuration of cache 1, 160, block 450. Once properly formatted and sized, the resulting cache line is stored in cache 1, 160, block 460.

If the obtained PTE has a fragment value of 3, then it is a 32 k-byte fragment (representing 8 pages, one of which is the requested page). In that this is equal to the 32 k-byte cutoff, table entry formatter 150 (at block 410) directs the obtained PTEs to cache 2, 170. Here, no reformatting is necessary in that cache 2, 170 expects to receive single PTEs within a cache line, block 470. However, in embodiments where cache 2, 170 expects a cache line of 4 (or 8 or more) PTEs, duplication, reformatting, and/or truncation would occur as described above to supply the expected amount of PTEs, block 480. Once properly formatted and sized, the cache line is stored in cache 2, 170, block 490.

It should be appreciated that by giving each (derived) PTE a revised address, no PTE is dependent upon another PTE's existence to function. Thus, the expiration of one PTE from a cache (due to a LRU algorithm or otherwise) does not have the potential to make other PTEs in cache useless. Thus, the cache is provided with the greatest number entries able to potentially generate a cache hit.

Similarly, rather than taking three PTE's (for example) returned from a fetch and placing them alone into a native format that has space for four (for example), thereby leaving one slot empty, the present method generates another slot capable of generating a cache hit.

The software operations described herein can be implemented in hardware such as discrete logic fixed function circuits including but not limited to state machines, field programmable gate arrays, application-specific circuits or other suitable hardware. The hardware may be represented in executable code stored in non-transitory memory such as RAM, ROM or other suitable memory in hardware descriptor languages such as, but not limited to, RTL and VHDL or any other suitable format. The executable code when executed may cause an integrated fabrication system to fabricate an IC with the operations described herein.

Also, integrated circuit design systems/integrated fabrication systems (e.g., work stations including, as known in the art, one or more processors, associated memory in communication via one or more buses or other suitable interconnect and other known peripherals) are known that create wafers with integrated circuits based on executable instructions stored on a computer-readable medium such as, but not limited to, CDROM, RAM, other forms of ROM, hard drives, distributed memory, etc. The instructions may be represented by any suitable language such as, but not limited to, hardware descriptor language (HDL), Verilog or other suitable language. As such, the logic, circuits, and structure described herein may also be produced as integrated circuits by such systems using the computer-readable medium with instructions stored therein. For example, an integrated circuit with the aforedescribed software, logic and structure may be created using such integrated circuit fabrication systems. In such a system, the computer readable medium stores instructions executable by one or more integrated circuit design systems that cause the one or more integrated circuit design systems to produce an integrated circuit.

The above detailed description and the examples described therein have been presented for the purposes of illustration and description only and not for limitation. For example, the operations described may be done in any suitable manner. The method may be done in any suitable order still providing the described operation and results. It is therefore contemplated that the present embodiments cover any and all modifications, variations or equivalents that fall within the spirit and scope of the basic underlying principles disclosed above and claimed herein. Furthermore, while the above description describes hardware in the form of a processor executing code, hardware in the form of a state machine or dedicated logic capable of producing the same effect are also contemplated.

What is claimed is:

1. A method of storing page table entries in a first cache, including:
   receiving a first page table entry having a fragment that contains address information for a requested first page and at least a second page logically adjacent to the first page; and
generating a second page table entry from the first page table entry to be stored with the first page table entry, the second page table entry providing address information for the second page, the address information for the second page being obtained via the fragment, the second page table entry having a configuration that is compatible with the first cache.

2. The method of claim 1, wherein the first cache is one of a plurality of caches available to receive page table entries, further including determining which of the available caches in which to place the first page table entry.

3. The method of claim 2, wherein the determination of in which cache to place the first page table entry is at least partially dependent upon the fragment size of the first page table entry.

4. The method of claim 3, wherein the determination of in which cache to place the first page table entry is at least partially dependent upon comparing the fragment size of the first page table entry to a cutoff value.

5. The method of claim 1, further including obtaining information regarding a native page size and number of page table entries per line of the cache for the first cache, obtaining a page table entry for each page identified by the first page table entry, and when a cumulative address space defined by having a page table entry for for each page identified by the first page table entry is larger than address space defined by the number of page table entries per line of the cache and the native page size of the cache, truncating the obtained page table entries to fit within a line of the cache.

6. The method of claim 1, further including obtaining information regarding a native page size and number of page table entries per line of the cache for the first cache, and when a cumulative address space defined by having a page table entry for for each page identified by the first page table entry is smaller than the address space defined by the number of page table entries per line of the cache and the native page size of the cache, duplicating at least one page table entry and storing said at least one duplicated page table entry with the first page table entry in the cache.

7. The method of claim 1, further including storing the first page table entry and the second page table entry in the first cache.

8. A page table entry allocation device including:
   a first cache having a first native configuration;
   a second cache having a second native configuration; and
   a table entry formatter operable to use a fragment associated with a received page table entry and convert the received page table entry into one of the first and second native configurations such that each page identified within the received page table entry is formatted into a page table entry that is able to be interpreted without reference to another page table entry.

9. The device of claim 8, wherein the first native configuration expects that page table entries stored therein represent a single 4 k page of address space.

10. The device of claim 9, wherein the second native configuration expects that page table entries stored therein represent more than one 4 k page of physical address space.

11. The device of claim 8, wherein at least one of the first and second caches are configurable such that their native configuration is configurable at run-time.

12. The device of claim 8, wherein the table entry formatter is operable to receive input from at least one of a page directory and a page table.

13. The device of claim 8, further including a memory management unit operable to determine which of the first cache and second cache in which to place the first page table entry.

14. The device of claim 13, wherein the memory management unit is operable to compare a fragment size of the first page table entry to a cutoff value to determine which of the first and second caches in which to place the first page table entry.

15. A method of allocating page table entries between a plurality of available caches including:
   receiving a first page table entry having a fragment value, the first page table entry having information regarding a requested first page and regarding at least a second page logically adjacent to the requested first page;
   receiving configuration data regarding an available configurable cache;
   generating a second page table entry from the first page table entry by using the fragment value of the first page table entry; and
combining the first page table entry and the second page table entry to generate a cache line consistent with a cache line configuration of one of the available caches.

16. The method of claim 15, further including selecting one of the available caches in which to store the generated cache line at least partially based upon the fragment value.

17. The method of claim 16, further including storing the generated cache line in the selected available cache.

18. The method of claim 15, further including storing the generated second page table entry in the configurable cache.

19. The method of claim 15, wherein generating a second page table entry generates the second page table entry such that the second page table entry is different than the first page table entry.

20. The method of claim 15, wherein generating a second page table entry generates the second page table entry such that the second page table entry identifies a set of pages that is the same set of pages identified by the first page table entry.

* * * * *